US012608022B2

(12) United States Patent (10) Patent No.: US 12,608,022 B2
Shen et al. (45) Date of Patent: Apr. 21, 2026

(54) METHODS, SYSTEMS, AND SERVERS FOR INDOOR OPERATION MONITORING OF CLEANING DEVICES

(71) Applicant: CENOBOTS INC., Austin, TX (US)

(72) Inventors: Hui Shen, Jiaxing (CN); Ling Wang, Jiaxing (CN); Gang Wang, Jiaxing (CN)

(73) Assignee: CENOBOTS INC., Austin, TX (US)

( * ) Notice: Subject to any disclaimer, the term of this patent is extended or adjusted under 35 U.S.C. 154(b) by 74 days.

(21) Appl. No.: 18/885,664

(22) Filed: Sep. 15, 2024

(65) Prior Publication Data

US 2025/0383670 A1 Dec. 18, 2025

(30) Foreign Application Priority Data

Jun. 13, 2024 (CN) .......................... 202410762553.4

(51) Int. Cl.
G05D 1/648 (2024.01)
*G05D 105/10* (2024.01)
*G05D 107/40* (2024.01)

(52) U.S. Cl.
CPC ......... G05D 1/648 (2024.01); *G05D 2105/10* (2024.01); *G05D 2107/40* (2024.01)

(58) Field of Classification Search
CPC . G05D 1/648; G05D 2105/10; G05D 2107/40
See application file for complete search history.

(56) References Cited

U.S. PATENT DOCUMENTS

2018/0353999 A1 12/2018 Mcgillicuddy et al.
2020/0004263 A1* 1/2020 Dalla Libera ......... G01S 7/4808
(Continued)

FOREIGN PATENT DOCUMENTS

CN 108398945 A 8/2018
CN 109363578 2/2019
(Continued)

OTHER PUBLICATIONS

First Office Action in Chinese Application No. 202410762553.4 mailed on Feb. 14, 2025, 25 pages.

*Primary Examiner* — Adam R Mott
*Assistant Examiner* — Sagar KC
(74) *Attorney, Agent, or Firm* — PORUS IP LLC

(57) ABSTRACT
A method for indoor operation monitoring of a cleaning device is provided, which is executed by a server of a system for indoor operation monitoring of a cleaning device. The method includes generating a work region map; forming a monitoring map based on location fingerprints taken from a work region in the work region map; determining working trajectory points of the cleaning device based on a set of positioning data; obtaining a monitoring task region through a monitoring terminal; determining, based on the monitoring map, a monitoring region map corresponding to the monitoring task region, matching the working trajectory points with the monitoring region map, and determining cumulative trajectory points within the monitoring task region; and in response to determining that a count of the cumulative trajectory points and distribution situation of the cumulative trajectory points satisfy a preset update condition, sending a display update instruction to the monitoring terminal.

10 Claims, 6 Drawing Sheets

(56)          References Cited

U.S. PATENT DOCUMENTS

| | | | | |
|---|---|---|---|---|
| 2020/0050995 | A1* | 2/2020 | Ramanand | ............ H04W 4/029 |
| 2021/0334534 | A1 | 10/2021 | Xiong et al. | |
| 2024/0085913 | A1* | 3/2024 | Zhang | ................ G01C 21/3837 |
| 2024/0142994 | A1* | 5/2024 | Ebrahimi Afrouzi ... A47L 11/30 |
| 2024/0160227 | A1* | 5/2024 | Huang | ................. G05D 1/0219 |

FOREIGN PATENT DOCUMENTS

| | | |
|---|---|---|
| CN | 112386171 | 2/2021 |
| CN | 114463271 | 5/2022 |
| JP | 2013034687 | 2/2013 |
| KR | 102626763 B1 | 1/2024 |

* cited by examiner

<u>300</u>

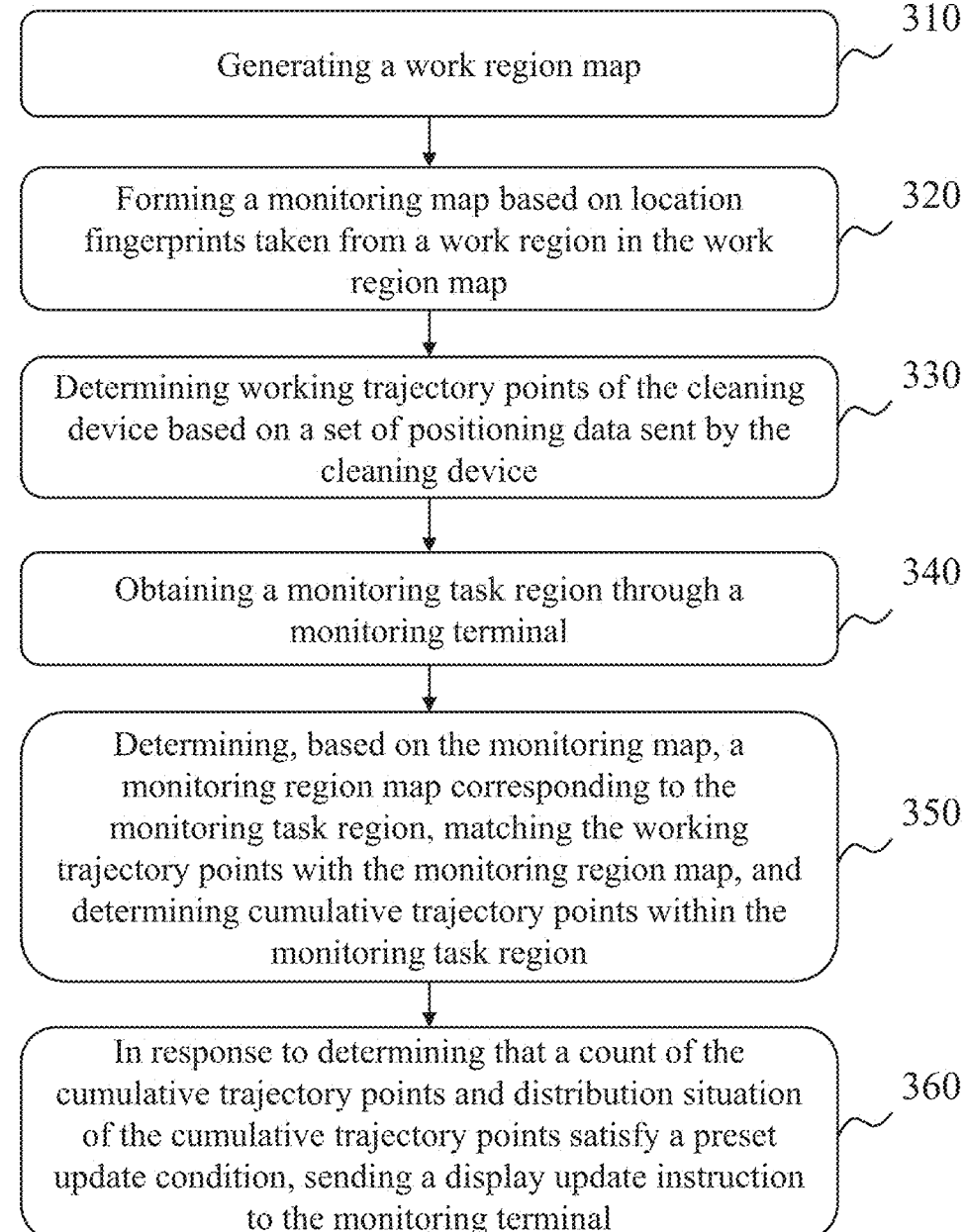

310 Generating a work region map

320 Forming a monitoring map based on location fingerprints taken from a work region in the work region map 330 Determining working trajectory points of the cleaning device based on a set of positioning data sent by the cleaning device 340 Obtaining a monitoring task region through a monitoring terminal 350 Determining, based on the monitoring map, a monitoring region map corresponding to the monitoring task region, matching the working trajectory points with the monitoring region map, and determining cumulative trajectory points within the monitoring task region 360 In response to determining that a count of the cumulative trajectory points and distribution situation of the cumulative trajectory points satisfy a preset update condition, sending a display update instruction to the monitoring terminal

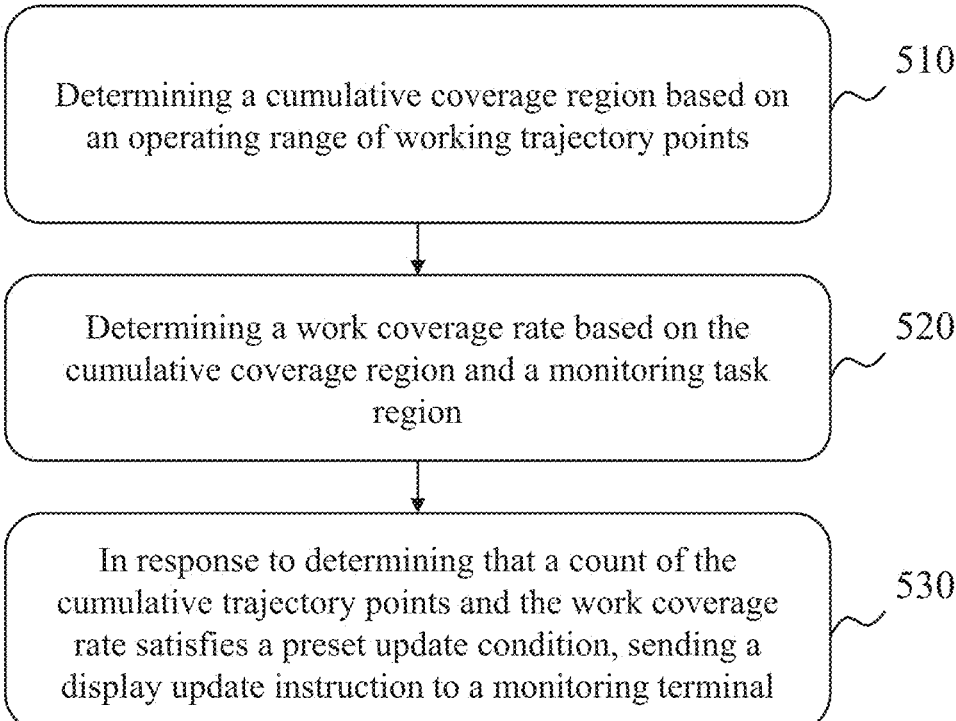

Determining a cumulative coverage region based on an operating range of working trajectory points                    510

Determining a work coverage rate based on the cumulative coverage region and a monitoring task region                    520

In response to determining that a count of the cumulative trajectory points and the work coverage rate satisfies a preset update condition, sending a display update instruction to a monitoring terminal                    530

FIG. 5

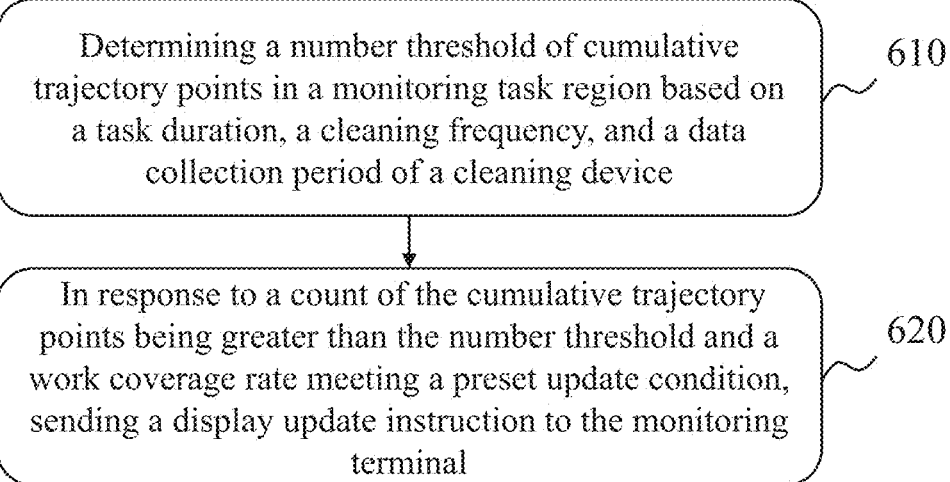

Determining a number threshold of cumulative trajectory points in a monitoring task region based on a task duration, a cleaning frequency, and a data collection period of a cleaning device 　610

In response to a count of the cumulative trajectory points being greater than the number threshold and a work coverage rate meeting a preset update condition, sending a display update instruction to the monitoring terminal 　620

FIG. 6

METHODS, SYSTEMS, AND SERVERS FOR INDOOR OPERATION MONITORING OF CLEANING DEVICES

CROSS-REFERENCE TO RELATED APPLICATIONS

This application claims priority to Chinese Patent Application No. 202410762553.4, filed on Jun. 13, 2024, the entire contents of which are incorporated herein by reference.

TECHNICAL FIELD

The present disclosure relates to the field of indoor positioning technology, and in particular, to methods, systems, and servers for indoor operation monitoring of cleaning devices.

BACKGROUND

With the development of society and technology, portable cleaning devices are commonly used in cleaning all kinds of indoor buildings in various current industries. Given the cleaning work involves a variety of types, a wide range of regions, and a variety of types of cleaning devices, there is a rising demand among enterprises for improving the efficiency of managing the cleaning staff and cleaning tasks. Currently, most new cleaning devices on the market that support task management and quantitative processing are installed with laser radar and cleaning computing units. By using indoor positioning technology, the cleaning devices can autonomously identify the environmental state to realize real-time monitoring, quantification, and feedback on task progress. However, the currently widely used traditional commercial cleaning devices, such as hand-held scrubbers and hand-push scrubbers, due to cost constraints, are impossible to install with computing units and laser radar sensors required for positioning like those of automatic cleaning robots, thus cannot obtain highly accurate positioning data. Therefore, it is often only possible to monitor the operating time of such devices, but not accurately monitor the operating range and regions the devices have operated in, resulting in inefficient management of tasks of the devices.

Accordingly, it is desired to provide a method, system, and server for indoor operation monitoring of a cleaning device to effectively monitor a moving position and a work region of a low-cost cleaning device and to accurately obtain the task completion status of the cleaning device, thereby efficiently improving the management efficiency of the cleaning device.

SUMMARY

One or more embodiments of the present disclosure provide a method for indoor operation monitoring of a cleaning device. The method may be performed by a server of a system for indoor operation monitoring of a cleaning device. The method may include generating a work region map; forming a monitoring map based on location fingerprints taken from a work region in the work region map; determining working trajectory points of the cleaning device based on a set of positioning data sent by the cleaning device; obtaining a monitoring task region through a monitoring terminal; determining, based on the monitoring map, a monitoring region map corresponding to the monitoring task region, matching the working trajectory points with the monitoring region map, and determining cumulative trajectory points within the monitoring task region; and in response to determining that a count of the cumulative trajectory points and a distribution situation of the cumulative trajectory points satisfy a preset update condition, sending a display update instruction to the monitoring terminal.

One or more embodiments of the present disclosure provide a system for indoor operation monitoring of a cleaning device. The system may include a cleaning device, a server connected to the cleaning device via a network, and a monitoring terminal for displaying a monitoring interface. The cleaning device may be configured to collect a set of positioning data based on a data collection period and send the set of positioning data to the server via the network. The server may be configured to generate a work region map; form a monitoring map based on location fingerprints taken from a work region in the work region map; determine working trajectory points of the cleaning device based on a set of positioning data sent by the cleaning device; obtain a monitoring task region through a monitoring terminal; determine, based on the monitoring map, a monitoring region map corresponding to the monitoring task region, match the working trajectory points with the monitoring region map, and determine cumulative trajectory points within the monitoring task region; and in response to determining that a count of the cumulative trajectory points and distribution situation of the cumulative trajectory points satisfy a preset update condition, send a display update instruction to the monitoring terminal. The monitoring terminal may be configured to update a display feature on the monitoring interface based on the display update instruction sent by the server.

One or more embodiments of the present disclosure provide a server comprising a memory, a processor, and a computer program stored in the memory and runnable on the processor. The processor may execute the computer program to implement the above-described method for indoor operation monitoring of the cleaning device.

BRIEF DESCRIPTION OF THE DRAWINGS

The present disclosure is further illustrated in terms of exemplary embodiments. These exemplary embodiments are described in detail with reference to according to the drawings. These embodiments are non-limiting exemplary embodiments, in which like reference numerals represent similar structures, and wherein:

FIG. 3 is a flowchart illustrating an exemplary method for indoor operation monitoring of a cleaning device according to some embodiments of the present disclosure;

FIG. 5 is a flowchart illustrating an exemplary process of sending a display update instruction according to some embodiments of the present disclosure; and FIG. 6 is a flowchart illustrating another exemplary process of sending a display update instruction according to some embodiments of the present disclosure.

DETAILED DESCRIPTION

To more clearly illustrate the technical solutions related to the embodiments of the present disclosure, a brief introduction of the drawings referred to the description of the embodiments is provided below. The accompanying drawings do not represent the entirety of the embodiments.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise", "comprises", "comprising", "include", "includes", and/or "including", merely prompt to include operations and elements that have been clearly identified, and these operations and elements do not constitute an exclusive listing. The methods or devices may also include other operations or elements.

When describing the operations performed in the embodiments of the present disclosure according to the steps, the order of the steps is interchangeable if not otherwise indicated, the steps can be omitted, and other steps can be included in the process of operation.

Figure 1:
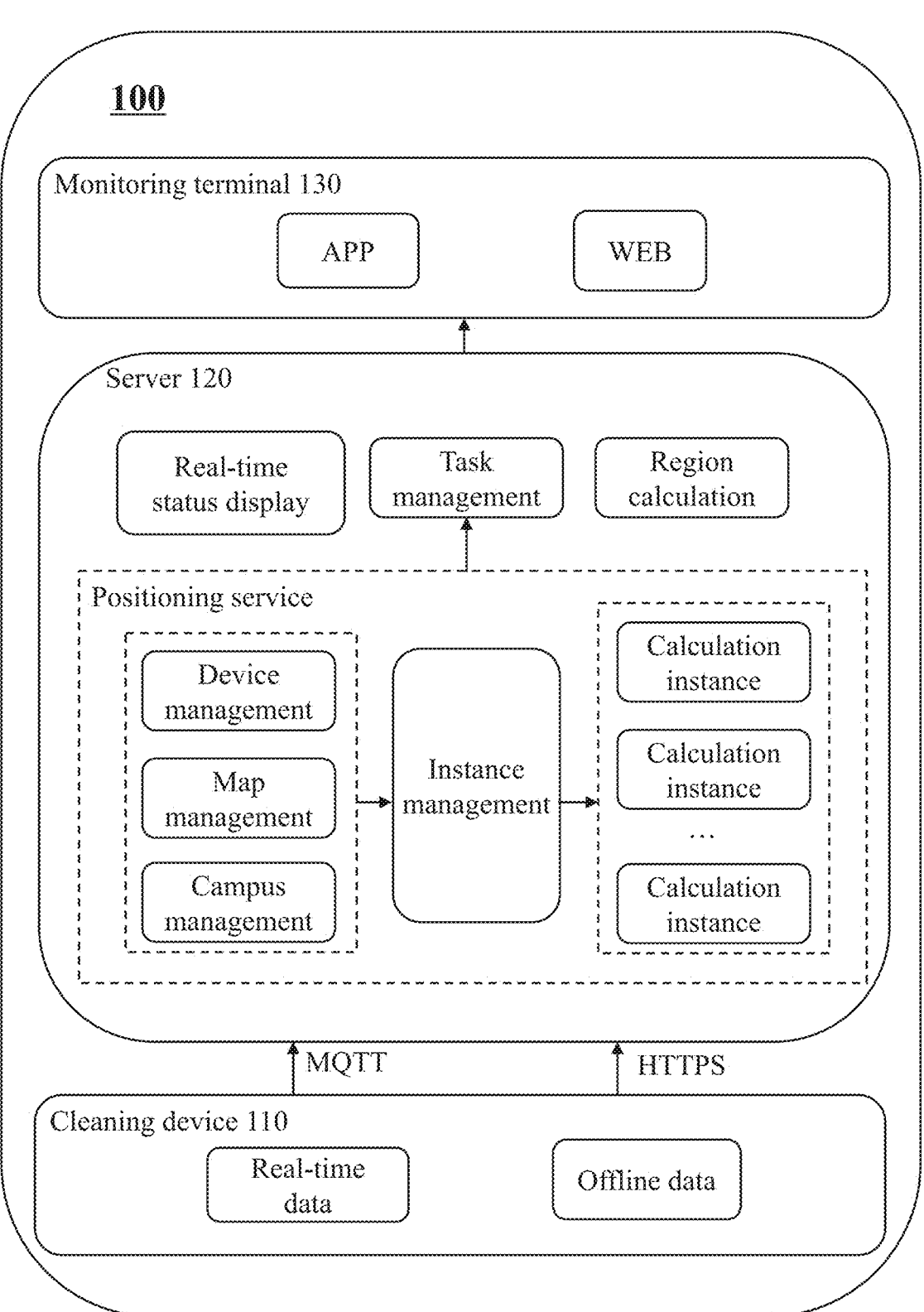
FIG. 1 is a schematic diagram illustrating a system for indoor operation monitoring of a cleaning device according to some embodiments of the present disclosure.

FIG. 1 is a schematic diagram illustrating a system for indoor operation monitoring of a cleaning device according to some embodiments of the present disclosure.

In some embodiments, a system for indoor operation monitoring of a cleaning device 100 (hereinafter referred to as a monitoring system 100) may include at least one cleaning device 110, a server 120 connected to the at least one cleaning device 110 via a network (not shown in the figures), and a monitoring terminal 130.

The cleaning device 110 refers to a device that performs a cleaning task. The cleaning task may include a cleaning region, a cleaning time, or the like.

The cleaning region refers to a region to be cleaned. The cleaning time refers to a duration of cleaning the region to be cleaned, e.g., 13:00 to 15:00. In some embodiments, the cleaning task may be pre-set by a user based on actual needs.

The cleaning device 110 is configured to collect a set of positioning data based on a data collection period and send the set of positioning data to the server via the network. The data collection period refers to a time interval at which the cleaning device collects the set of positioning data. In some embodiments, the data collection period may be pre-set based on historical experience.

In some embodiments, the cleaning device 110 may have a Bluetooth module, a WiFi module, and a microcontroller connected to the Bluetooth module and the WiFi module. The Bluetooth module is configured to obtain a Bluetooth signaling feature, and the WiFi module is configured to obtain a WiFi signaling feature. The microcontroller is configured to control the communication of the Bluetooth module and the WiFi module and the data transmission.

In some embodiments, the WiFi module may include a wireless data collector, a wireless signal detector, or the like. The Bluetooth module may include a Bluetooth sensor, or the like.

In some embodiments of the present disclosure, compared to the traditional global positioning system (GPS) positioning technology, the positioning of the cleaning device having the Bluetooth module and the WiFi module has a lower cost, and solves the problem that the GPS cannot be applied indoors, which effectively improves the positioning of the minimum accuracy, ensuring the accuracy of the obtained positioning of the cleaning device.

The server is configured to generate a work region map; form a monitoring map based on location fingerprints taken from a work region in the work region map; determine working trajectory points of at least one cleaning device based on a set of positioning data sent by the at least one cleaning device; obtain a monitoring task region through a monitoring terminal; determine, based on the monitoring map, a monitoring region map corresponding to the monitoring task region, match the working trajectory points with the monitoring region map, and determine cumulative trajectory points within the monitoring task region; and in response to determining that a count of the cumulative trajectory points and distribution situation of the cumulative trajectory points satisfy a preset update condition, send a display update instruction to the monitoring terminal.

Figure 2:
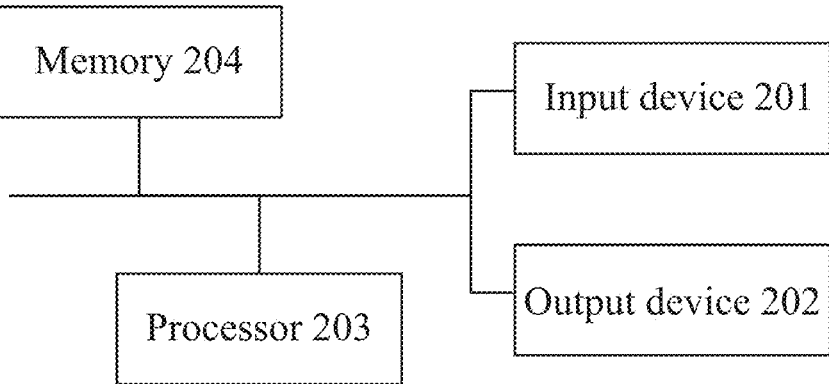
FIG. 2 is a schematic diagram illustrating a server according to some embodiments of the present disclosure.

FIG. 2 is a schematic diagram illustrating a server according to some embodiments of the present disclosure. In some embodiments, the server may include an input device 201, an output device 202, a processor 203, and a memory 204 as shown in FIG. 2.

The input device 201 is configured to obtain data outside the server. For example, the input device 201 may obtain a set of positioning data uploaded by a cleaning device.

The output device 202 is configured to output data within the server. For example, the output device 202 may send a display update instruction to a monitoring terminal. In some embodiments, the input device and the output device may include ports such as hubs, routers, or the like.

The memory 204 is configured to store a computer program that can be run on the processor. In some embodiments, the storage device 204 may include mass storage, removable memory, or the like, or any combination thereof. In some embodiments, the storage device 204 may be integrated in the processor 203.

The processor 203 is configured to implement a method for indoor operation monitoring of a cleaning device when executing a computer program. In some embodiments, the processor 203 may include a central processing unit (CPU), an application-specific integrated circuit (ASIC), an application-specific instruction set processor (ASIP), a graphics processing unit (GPU), or the like, or any combination thereof.

In some embodiments, the server is further configured to determine a cumulative coverage region based on an operating range of the working trajectory points; determine the work coverage rate based on the cumulative coverage region and the monitoring task region; and in response to determining that the count the cumulative trajectory points and the work coverage rate satisfies the preset update condition, send the display update instruction to the monitoring terminal.

In some embodiments, the server is further configured to obtain a regional feature of the monitoring task region; and determine the operating range based on the regional feature and device parameters of the cleaning device corresponding to the working trajectory points.

In some embodiments, the server is further configured to determine the operating range based on the working trajectory points, the regional feature, the device parameters, pedestrian flow data, weather data, and historical cleaning data through a range determination model.

In some embodiments, the server is further configured to determine a number threshold of the cumulative trajectory points in the monitoring task region based on a task duration, a cleaning frequency, and a data collection period of the cleaning device; and in response to the count of the cumulative trajectory points being greater than the number threshold and the work coverage rate meeting the preset update condition, send the display update instruction to the monitoring terminal.

In some embodiments, the server is further configured to obtain pedestrian flow data through the monitoring device; determine an estimated pedestrian flow based on the pedestrian flow data, and adjust the display update instruction based on the estimated pedestrian flow.

In some embodiments, the server is further configured to determine a pedestrian flow index based on the estimated pedestrian flow; determine, in response to the pedestrian flow index satisfying an adjustment condition, a cleaning time point based on the estimated pedestrian flow; and generate a cleaning instruction based on the cleaning time point, and send the cleaning instruction to the at least one cleaning device to control the at least one cleaning device to perform the cleaning work.

In some embodiments, as shown in FIG. 1, the server may have functions such as real-time status display, task management, region calculation, and positioning service. The server may perform the task management via the positioning service.

The positioning service may include instance management. The instance management refers to the management of a current cleaning work. In some embodiments, the server may perform calculations based on data obtained from device management, map management, and campus management to obtain a plurality of calculation instances and perform the task management based on the plurality of calculation instances. The calculation instances refer to results of the positioning calculation for the cleaning device.

The monitoring terminal is used to display a monitoring interface. The monitoring interface refers to an interface that displays the monitoring task region.

The monitoring terminal is configured to update a display feature on a current monitoring interface based on the display update instruction sent by the server.

In some embodiments, the monitoring terminal may include an electronic device such as a smartphone, a personal digital assistant (PDA), or the like. The user may view information about the monitoring task region through the monitoring terminal. The user may include people who dispatch the cleaning device.

In some embodiments, the monitoring terminal may display the monitoring interface by an application (APP) or a Web terminal, etc.

In some embodiments, the monitoring system 100 may also include a plurality of monitoring devices.

The monitoring device refers to a device that collect image data within the monitoring task region. In some embodiments, the monitoring device may include a device such as a camera mounted in the monitoring task region. The monitoring device may upload the image data to the server.

More detailed descriptions may be found in FIGS. 3-6 and related descriptions thereof.

In some embodiments, the system for indoor operation monitoring of the cleaning device may further include an intelligent cleaning device. The intelligent cleaning device includes laser radar.

In some embodiments, the intelligent cleaning device may include an intelligent robot having laser radar with a positioning calculation module, etc. The positioning calculation module may be used to collect the location fingerprints.

The intelligent cleaning device is configured to generate, through the laser radar, the work region map and collect the location fingerprints. For example, the intelligent robot having the laser radar may draw the work region map by the laser radar when first deployed in the work region and move according to a preset path, automatically collect the location fingerprints during the movement. Descriptions regarding the work region map and the location fingerprints may be found in FIG. 2 and its related descriptions.

In some embodiments of the present disclosure, when the cleaning device is the intelligent cleaning device having the laser radar and the positioning calculation module, the work region map may be generated and the location fingerprints may be collected directly and autonomously by the intelligent cleaning device, which improves the flexibility and adaptability of generating the work region map and collecting the location fingerprints and reduces data error.

In some embodiments of the present disclosure, by the system for indoor operation monitoring of the cleaning device, relevant information of the monitoring task region may be clearly displayed, the task completion status in the monitoring task region may be effectively monitored, the efficiency of the task management of the cleaning device is improved, and the systematic display of the cleaning work of the cleaning device and the clear management of the cleaning task may be realized.

FIG. 3 is a flowchart illustrating an exemplary method for indoor operation monitoring of a cleaning device according to some embodiments of the present disclosure. In some embodiments, the process 300 is performed by a server of a system for indoor operation monitoring of a cleaning device. As shown in FIG. 3, process 300 includes the following operations.

In 310, a work region map is generated.

The work region map refers to a map that contains geographic information related to a work region. For example, the work region map may include at least one of layout structures of the work region, buildings within the work region, or the like.

The work region refers to a region in which the cleaning device operates. In some embodiments, the work region may include a plurality of monitoring task regions. Descriptions regarding the monitoring task regions may be found in operation 340 and its related description.

In some embodiments, the server may generate the work region map in a plurality of ways. For example, the server may use an image of the work region map as a base image to draw the work region map corresponding to the work region via drawing software. The image of the map refers to a picture associated with the work region. The drawing software may include commonly used drawing software. The present disclosure does not limit the drawing software.

In some embodiments, the server may obtain the map image of the work region through an image library. The map image of the work region may also be obtained through, for example, user input. The image library may include the local image library and/or the network image library, among others.

In 320, a monitoring map is formed based on location fingerprints taken from the work region in the work region map.

The location fingerprints refer to signals relating to location matching. In some embodiments, the location fingerprints may include a WiFi signaling feature, a Bluetooth signaling feature, and/or a geomagnetic signaling feature. The WiFi signaling feature is used to characterize the signal strength of a WiFi signal, and the Bluetooth signaling feature is used to characterize the signal strength of a Bluetooth signal. The geomagnetic signaling feature is used to characterize the signal strength of a geomagnetic signal.

In some embodiments, the WiFi signaling feature and the Bluetooth signaling feature may be collected by a WiFi module and a Bluetooth module of the cleaning device. The cleaning device may also include a geomagnetic sensor. The geomagnetic signaling feature may be obtained by the geomagnetic sensor.

In some embodiments, the location fingerprints may be obtained in a variety of ways. For example, a technician may move within a work region following a preset path and utilize a collection device to collect the location fingerprints during the movement. The collection device refers to a device for collecting the location fingerprints. For example, a smartphone, or the like.

In some embodiments, the location fingerprints may also be obtained by an intelligent cleaning device.

In some embodiments, the cleaning device may collect the location fingerprints based on a data collection period via the Bluetooth module and the WiFi module, or the like, when performing cleaning work, which is used for location matching. Descriptions regarding the data collection period may be found in FIG. 1 and its related description.

The monitoring map refers to map data used to locate and match the cleaning device. In some embodiments, the server may combine the location fingerprints of each location in the work region map with the work region map by mapping, or the like, to generate the monitoring map.

In 330, working trajectory points of the cleaning device is determined based on a set of positioning data sent by the cleaning device.

The set of positioning data refers to a data set related to the location of the cleaning device. In some embodiments, the set of positioning data may include data related to the location fingerprints collected by the cleaning device.

In some embodiments, the set of positioning data sent by the cleaning device may also include a device operating status. The device operating status refers to data characterizing an operational state of the cleaning device. For example, a degree of wear and tear, a usage duration, a current power level, a speed at which the blower is running, an amount of water in storage, and whether or not the disk brushes are functioning properly.

The working trajectory points refer to points that characterize the movement of the cleaning device in the monitoring map.

In some embodiments, the server may parse the set of positioning data based on a preset parsing manner to obtain a plurality of pieces of location data. The preset parsing manner may include performing location-by-location calculations on the data, and task-slicing calculations, or the like.

The location data may include location information and time information of the cleaning device. The time information refers to the time when the location information is obtained.

The location information refers to data related to the location of the cleaning device in the work region map. In some embodiments, the location information may include identification information and coordinate data of the building in which the cleaning device is located, as well as the floor.

The coordinate data is used to reflect the location of the cleaning device in the work region map. In some embodiments, the coordinate data may be represented by the coordinates of the x-axis and y-axis in the world coordinate system.

In some embodiments, the server may, based on a plurality of pieces of location data, locate and match each location data with the monitoring map to obtain a plurality of working trajectory points.

In 340, a monitoring task region is obtained through a monitoring terminal.

Descriptions regarding the monitoring terminal may be found in FIG. 1 and its related description.

The monitoring task region refers to the cleaning region that needs to be monitored. Descriptions regarding the cleaning region may be found in FIG. 1 and its related description.

In some embodiments, the server may obtain the monitoring task region through the monitoring terminal. The monitoring task region may be pre-set by the user through the monitoring terminal and displayed on a monitoring interface.

Understandably, in order to monitor and manage the cleaning device in a more fine-grained manner, the user may divide the work region of the same floor to obtain a plurality of monitoring task regions, so as to monitor the plurality of monitoring task regions separately. For example, the user may pre-set n buildings such as B1, B2 . . . . Bn in terms of floor settings as well as setting up a plurality of zones on each floor, such as dividing the B1 building into B1-1 floor, B1-2 floor . . . B1-m floor. Where m denotes the count of floors of the B1 building, and B1-1 floor may be set up a plurality of different monitoring task regions. Users may set cleaning tasks for each monitoring task region.

In 350, a monitoring region map corresponding to the monitoring task region is determined based on the monitoring map, the working trajectory points are matched with the monitoring region map, and cumulative trajectory points within the monitoring task region are determined.

The monitoring region map refers to a map block in the monitoring map that correspond to the monitoring task regions.

In some embodiments, the server may determine the monitoring region map in a plurality of ways. For example, the user may determine the monitoring region map by performing operations such as box checking on the monitoring interface displayed by the monitoring terminal and send the monitoring region map to the server through the monitoring terminal.

In some embodiments, the server may, based on the identification information of the monitoring interface, select a region corresponding to the identification information in the monitoring map as the monitoring region map. Descriptions regarding the monitoring interface may be found in operation 360 and its related description.

The identification information is used to identify the location of the monitoring task region. In some embodiments, the identification information may include a building identification, a floor identification, and a region identification. The building identification is used to identify the building to which the current monitoring map belongs. The floor identification is used to identify the floor to which the current monitoring map belongs. The region identification is used to identify the monitoring task region in the monitoring map.

In some embodiments, the identification information may be obtained, e.g., by pre-setting by the user.

In some embodiments of the present disclosure, the identification information allows for a monitoring region map to be quickly determined, reducing the amount of server calculations.

The cumulative trajectory points refer to a plurality of working trajectory points within the monitoring task region. For example, the cumulative trajectory points may include all of the working trajectory points within the monitoring task region.

In some embodiments, the server may determine the working trajectory points within the monitoring region map as the cumulative trajectory points based on the locations of the plurality of working trajectory points with the monitoring region map and perform location matching by a map matching algorithm. The map matching algorithm may include an edge feature matching algorithm and a Gaussian distribution algorithm, etc.

In 360, in response to determining that a count of the cumulative trajectory points and distribution situation of the cumulative trajectory points satisfy a preset update condition, a display update instruction is sent to the monitoring terminal.

The distribution situation of the cumulative trajectory points is used to reflect the denseness of the distribution of the cumulative trajectory points. In some embodiments, the distribution situation of the cumulative trajectory points may be represented by distance between the cumulative trajectory points.

In some embodiments, the server may count a count of the cumulative trajectory points within the monitoring task region and calculate the distance of every two cumulative trajectory points to obtain a plurality of distance values and determine the mean and/or median of the plurality of distance values as the distance between the cumulative trajectory points in the monitoring task region. The smaller the distance of the cumulative trajectory points, the denser the distribution situation of the cumulative trajectory points.

The preset update condition refers to a condition used to determine whether to send the display update instruction. In some embodiments, the preset update condition may include the count of the cumulative trajectory points within the monitoring task region being greater than a preset number threshold and the distance between the cumulative trajectory points being greater than a preset distance. The preset number threshold and the preset distance may be pre-set based on historical experience.

It is understood that the count of the cumulative trajectory points and their distribution situation satisfying the preset update condition indicates that the cleaning task in the monitoring task region has been completed, and the server may issue the display update instruction to make an update to the task completion status of the monitoring task region in the monitoring interface.

The display update instruction is used to instruct the monitoring terminal to update the monitoring interface. In some embodiments, the display update instruction may include the monitoring task region for which cleaning has been completed and a task completion rate. The task completion rate may characterize the completion of the cleaning task.

In some embodiments, in response to the count of the cumulative trajectory points within at least one monitoring task region and the distribution situation satisfying the preset update condition, the server may determine the monitoring task region meeting the preset update condition as the monitoring task region for which the cleaning has been completed. The server may also calculate aa ratio of the count of monitoring task regions for which cleaning has been completed to the count of all monitoring task regions and determine the ratio as the task completion rate.

In some embodiments, in response to the count of the cumulative trajectory points and a work coverage rate satisfying the preset update condition, the server may send the display update instruction to the monitoring terminal. More descriptions may be found in FIG. 5 and its related description.

Figure 4:
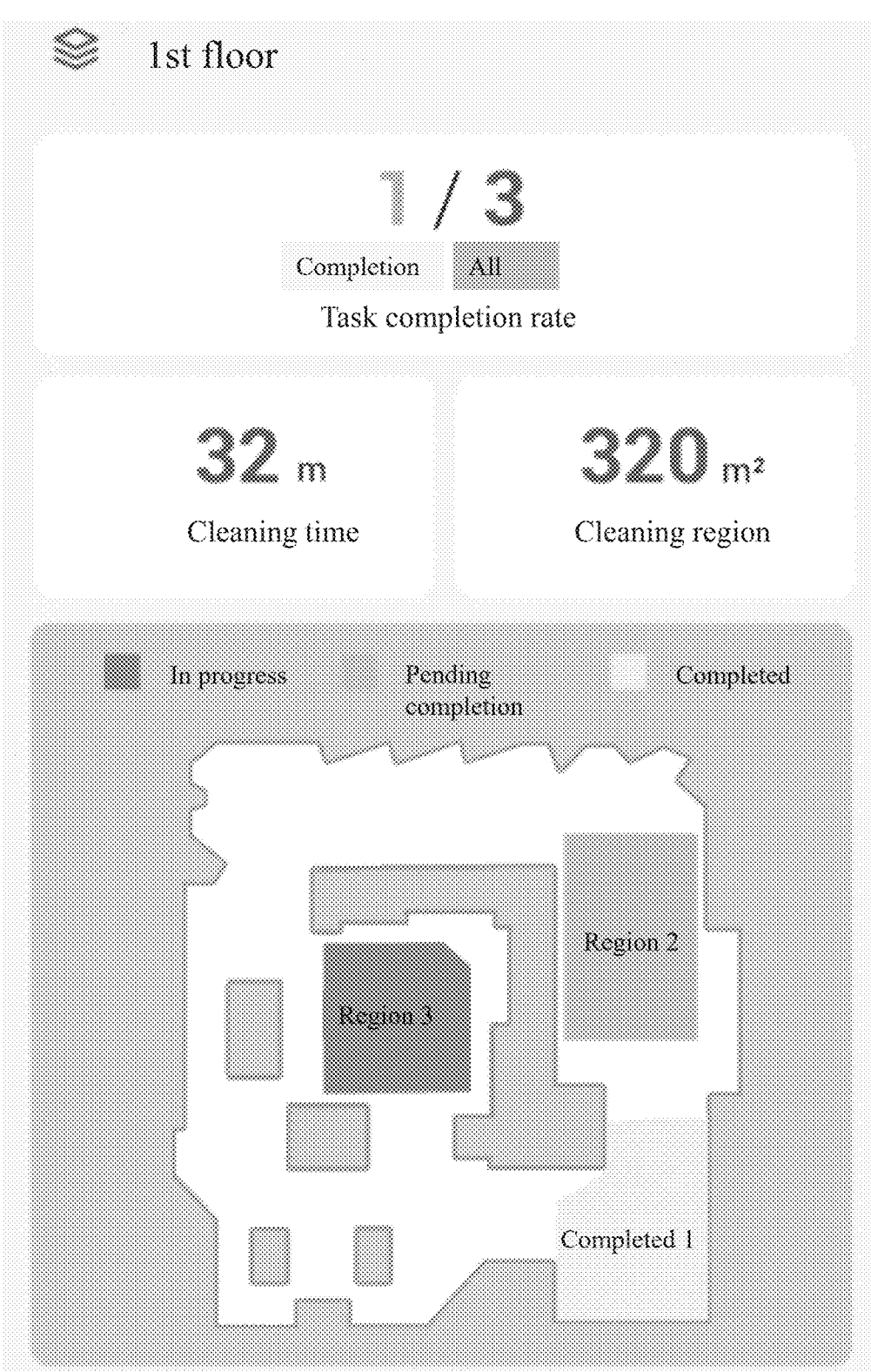
FIG. 4 is a schematic diagram illustrating a monitoring interface according to some embodiments of the present disclosure.

FIG. 4 is a schematic diagram illustrating a monitoring interface according to some embodiments of the present disclosure. In some embodiments, the monitoring interface may be as shown in FIG. 4, where a current floor of the work region map may be displayed at the top of the monitoring interface, a task completion rate may be displayed below the display of the current floor, a duration of the cleaning time and a size of the cleaning region may be displayed below the display of the task completion rate, and a plurality of monitoring task regions corresponding to the current floor and a task completion status of each monitoring task region may be displayed at the bottom of the monitoring interface. The task completion status may include work in progress, pending completion, and completed.

In some embodiments, the monitoring terminal may switch a first display feature of a monitoring task region for which cleaning has been completed to a second display feature based on the display update instruction and update the task completion rate.

The display features are used to differentiate task completion in different monitoring task regions. In some embodiments, the display features may be represented by, for example, grayscale. For example, as shown in FIG. 4, the task completion status is the darkest shade of gray for the monitoring task region of the work in progress, the task completion status is the medium shade of gray for the monitoring task region of the to-be-completed task, and the task completion status is the lightest shade of gray for the monitoring task region where the task is completed.

In some embodiments, the display features may include the first display feature and the second display feature. The first display feature refers to a display feature where the task completion status is pending or in progress in the monitoring task region. The second display feature is a display feature of the monitoring task region whose task completion status is completed. In some embodiments, the grayscale of the first display feature and the second display feature may be pre-set, with the grayscale of the first display feature being greater than the grayscale of the second display feature.

According to some embodiments of the present disclosure, by determining whether the count of the cumulative trajectory points in the monitoring task region and their distribution situation satisfies the preset update condition, it is possible to quickly determine whether the cleaning task in the monitoring task region is completed, and then update the monitoring interface to display, achieving effective monitoring of the work region and the movement location of the low-cost cleaning device, and accurately obtaining the task completion status of the cleaning device, thereby effectively improving the management efficiency of the cleaning device.

It should be noted that the foregoing description of process 300 is intended to be exemplary and illustrative only and does not limit the scope of application of the present disclosure. For those skilled in the art, various corrections and changes to the process hand-eye calibration may be made under the guidance of the present disclosure. However, these corrections and changes remain within the scope of the present disclosure.

FIG. 5 is a flowchart illustrating an exemplary process of sending a display update instruction according to some embodiments of the present disclosure. In some embodiments, process 500 is performed by a server of a system for indoor operation monitoring of a cleaning device. As shown in FIG. 5, the process 500 includes the following operations:

In 510, a cumulative coverage region is determined based on an operating range of working trajectory points. Description regarding the working trajectory points may be found in FIG. 3 and its related descriptions.

The operating range refers to a range that the cleaning device may clean when it is located at the working trajectory points. In some embodiments, the server may determine the operating range in a plurality of ways. For example, the user may take a circular region of a preset radius centered on the working trajectory points as the operating range of the working trajectory points through the monitoring terminal and send the operating range to the server through the monitoring terminal.

In some embodiments, the server may obtain a regional feature of the monitoring task region, and determine the operating range based on the regional feature and device parameters of the cleaning device corresponding to the working trajectory points. Description regarding the monitoring task region may be found in FIG. 3 and its related descriptions.

The regional feature refers to data associated with the monitoring task region. In some embodiments, the region feature of the monitoring task region may include a shape of the monitoring task region, a size of the area, historical missed locations, a floor material of the region, or the like.

In some embodiments, the server may obtain the shape of the monitoring task region, the size of the area, the historical missed locations, the floor material of the region via memory or user pre-input.

The historical missed locations are locations that were not cleaned in the monitoring task region in the historical data.

In some embodiments, the server may determine the historical missed locations based on historical cleaning data. For example, the server may determine regions within the historical monitoring task region in the historical cleaning data that are outside of the historical cumulative coverage region as the historical missed locations. The historical cleaning data may include historical monitoring task region, a historical cumulative coverage region, and a historical work coverage rate. The historical cumulative coverage region refers to the cumulative coverage region corresponding to the monitoring task region in the historical data. The historical work coverage rate refers to a work coverage rate corresponding to the monitoring task region in the historical data.

The floor material of the region refers to a floor material of the monitoring task region. For example, the floor material of the region may include carpet, tile, wood flooring, or the like.

In some embodiments, the server may determine the operating range of the working trajectory points in a plurality of ways based on the device parameters of the cleaning device corresponding to the working trajectory points, and the regional feature. For example, the server may determine an operating radius based on an initial operating radius, the count of historical missed locations, and the pedestrian flow data, and take the circular region of the operating radius centered on the working trajectory points as the operating range of the working trajectory points. The server may determine the initial operating radius based on the device parameters and the regional feature of the cleaning device corresponding to the working trajectory points.

The device parameters of the cleaning device refer to data related to the cleaning device. In some embodiments, the device parameters of the cleaning device may include a device size, a device type, a device weight, a cleaning efficiency, and a device turning radius.

In some embodiments, the server may obtain the device parameters of the cleaning devices through the memory. The memory may identify each cleaning device by, for example, a number, and store the device parameters of the cleaning device separately based on the identification.

The initial operating radius refers to the furthest distance that the cleaning device is capable of cleaning at a working trajectory point. In some embodiments, the server may determine the initial operating radius based on the device parameters and the regional feature. For example, the server may construct a cleaning feature vector based on the device parameters and the regional feature, select a reference feature vector that satisfies a matching condition with the cleaning feature vector in a vector database, and determine a reference operating radius corresponding to the reference feature vector as the initial operating radius. The cleaning feature vector refers to a feature vector constructed from the device parameters and the regional feature.

In some embodiments, the vector database may include a plurality of reference feature vectors and a reference operating radius corresponding to each reference feature vector.

In some embodiments, the vector database may be pre-set based on a plurality of experiments. For example, the technician may conduct a plurality of experiments on the monitoring task region, obtain the device parameters and the regional feature of the cleaning device corresponding to each experiment, construct a plurality of reference feature vectors based on the device parameters and the regional feature of the cleaning device corresponding to each experiment, and determine the actual operating range in the experiment as the reference operating radius corresponding to the reference feature vector. The plurality of experiments may include obtaining a plurality of working trajectory points by utilizing different cleaning devices to clean different monitoring task regions and measuring the actual operating range of each of the plurality of working trajectory points. The reference feature vector refers to a feature vector of the device parameters and the regional feature of the cleaning device corresponding to each experiment.

In some embodiments, the server may include the device operating status when constructing the cleaning feature vector and may include the device operating status of the cleaning device corresponding to the experiment when constructing the reference feature vector in the vector database. Descriptions regarding the device operating status may be found in FIG. 3 and its related descriptions.

In some embodiments, the operating radius may be negatively correlated with a count of historical missed locations and the pedestrian flow data. Exemplarily, the processor may determine the operating radius by a preset equation based on the initial operating radius, the count of historical missed locations, and the pedestrian flow data. The preset equation may be as shown in equation (1):

$$R = R1 - a * M - b * P \qquad (1)$$

Where R denotes the operating radius, R1 denotes the initial operating radius, M denotes the count of historical missed locations, P denotes the pedestrian flow data, and a and b denote a coefficient of the count of historical missed locations and a coefficient of the pedestrian flow data, respectively. The coefficients a and b may be pre-set based on historical experience. Descriptions regarding the pedestrian flow data may be found in related description hereinafter.

According to some embodiments of the present disclosure, the regional feature and the device parameters of the cleaning device allow for the determination of a more realistic operating range, which in turn facilitates the subsequent determination of a more accurate cumulative coverage region.

In some embodiments, the server may determine the operating range based on the working trajectory points, the regional feature, the device parameters, the pedestrian flow data, the weather data, and the historical cleaning data through a range determination model. Detailed descriptions may be found in related description hereinafter.

The cumulative coverage region refers to a range that the cleaning device may clean within the monitoring task region. In some embodiments, the server determines an intersection of a plurality of operating ranges as the cumulative coverage region based on the plurality of operating ranges corresponding to a plurality of cumulative trajectory points in the monitoring task region.

In 520, the work coverage rate is determined based on the cumulative coverage region and the monitoring task region.

The work coverage rate is used to characterize the degree of the cleaning device completing cleaning the monitoring task region. The greater the work coverage rate, the greater the degree of the cleaning device completing cleaning the monitoring task region.

In some embodiments, the server may determine the work coverage rate based on the cumulative coverage region and the monitoring task region. For example, the server may determine a ratio of the area of the cumulative coverage region to the area of the monitoring task region as the work coverage rate corresponding to the monitoring task region.

In 530, in response to determining that the count of the cumulative trajectory points and the work coverage rate satisfy the preset update condition, the display update instruction is sent to the monitoring terminal.

In some embodiments, the preset update condition may further include the work coverage rate greater than a coverage threshold. The coverage threshold may be pre-set based on historical experience.

In some embodiments, in response to determining that the count of the cumulative trajectory points in at least one monitoring task region and the work coverage rate satisfy the preset update condition, the server may send the display update instruction to the monitoring terminal to update the task completion status in the monitoring task region. Detailed descriptions the display update instruction may be found in FIG. 3 and its related description.

FIG. 6 is a flowchart illustrating another exemplary process of sending a display update instruction according to some embodiments of the present disclosure.

In 610, a number threshold of the cumulative trajectory points in the monitoring task region is determined based on a task duration, a cleaning frequency, and a data collection period of the cleaning device.

In some embodiments, a preset algorithm may be pre-set based on historical experience. For example, the preset algorithm may be a higher number threshold for a longer task duration, a higher cleaning frequency, and a shorter data collection period.

The task duration refers to a duration of the cleaning time of the cleaning task. Descriptions regarding the cleaning time and the data collection period may be found in FIG. 1 and its related description.

The cleaning frequency refers to a time of cleaning performed by the cleaning device in the monitoring task region. In some embodiments, the server may obtain the cleaning frequency via the cleaning device. The cleaning device may send a message to the server about the completion of cleaning after completing each cleaning.

In 620, in response to the count of the cumulative trajectory points being greater than the number threshold and the work coverage rate meeting the preset update condition, the display update instruction is sent to the monitoring terminal.

In some embodiments, in response to the count of the cumulative trajectory points in the monitoring task region being greater than the number threshold and the work coverage rate meeting the preset update condition, the server may send the display update instruction to the monitoring terminal to update the task completion status in the monitoring task region.

In some embodiments of the present disclosure, by determining whether the count of the cumulative trajectory points is greater than the number threshold and whether the work coverage rate satisfies the preset update condition, the accuracy of determining the task completion status of the cleaning device may be further improved.

In some embodiments, there may be a plurality of cooperating cleaning devices performing the same cleaning task in the same monitoring task region, at this time, the task completion status in that monitoring task region requires assessing the common progress of the plurality of cooperating cleaning devices.

In some embodiments, the server may obtain a selected monitoring task attribute and the monitoring task region in the current monitoring interface, screen the cleaning devices whose location information indicates working trajectory points localized within the monitoring task region according to the monitoring task attribute, and select a plurality of cleaning devices corresponding to the monitoring task attribute, and form the working trajectory points corresponding to the plurality of cleaning devices into a first track point group. The monitoring task attribute is used to distinguish between different cleaning tasks. For example, the monitoring task attributes may include dry sweeping, wet sweeping, or the like.

Some of these cleaning devices have a plurality of cleaning functions and may be involved in accomplishing a plurality of cleaning tasks. Such devices may add task identifiers for indicating currently executed monitoring task attributes to the sent the set of positioning data, and the server may determine corresponding monitoring task attributes for such cleaning devices based on the task identifiers.

In some embodiments, if the set of positioning data of the cleaning devices with a plurality of cleaning functions does not include the task identifiers, the server may obtain monitoring task attributes corresponding to the cleaning devices through the memory, determine whether the stored monitoring task attribute matches the current monitoring task attribute. If the stored monitoring task attribute matches the current monitoring task attribute, the server may add the corresponding working trajectory points of the cleaning devices to the first track point group.

In some embodiments, the server may select the working trajectory points in the first track point group from the start time of the cleaning task to the current time as second working trajectory points, calculate the count of the second working trajectory points, and determine the cumulative coverage region based on an operating range the second working trajectory points, thus determining a current work coverage rate of the monitoring task region.

In some embodiments, if the count of the second working trajectory points is greater than the number threshold and the work coverage rate is greater than the coverage threshold, the server may send the display update instruction to the monitoring terminal to update the task completion status in the monitoring task region.

In some embodiments, the server may determine the coverage threshold based on the data collection period and the cleaning time of the cleaning devices corresponding to the plurality of second working trajectory points. For example, for the monitoring task region, the data collection period of the first cleaning device is collected once in a second, the data collection period of the second cleaning device is collected once in b seconds, and the cleaning time is m hours, then the coverage threshold S may be: S=M*3600/min (a, b). The present disclosure does not limit the manner in which the coverage threshold is determined.

In some embodiments of the present disclosure, the efficiency of monitoring the cleaning task may be further improved by monitoring the cleaning work of the plurality of cooperating cleaning devices.

In some embodiments of the present disclosure, introducing the work coverage rate into the preset update condition may avoid a situation in which the cleaning region is not completely cleaned due to the cleaning device cleaning the same location for a long time and thus misjudging that the cleaning task has been completed, thus improving the accuracy of determining task completion status.

It should be noted that the foregoing description of the process 500 is intended to be exemplary and illustrative only and does not limit the scope of application of the present disclosure. For those skilled in the art, various corrections and changes to the process hand-eye calibration may be made under the guidance of the present disclosure. However, these corrections and changes remain within the scope of the present disclosure.

In some embodiments, the regional feature may include an obstacle feature. The server may determine the operating range based on the working trajectory points, the regional feature, the device parameters, the pedestrian flow data, the weather data, and the historical cleaning data, through the range determination model. Descriptions regarding the pedestrian flow data may be found below and its related descriptions. More descriptions regarding the working trajectory points, the regional feature, the device parameters, and the historical cleaning data may be found in FIG. 3 and FIG. 5 and related descriptions thereof.

The weather data refers to data related to the weather corresponding to the cleaning time. In some embodiments, the weather data may include indoor and/or outdoor temperature, humidity, and rainfall. In some embodiments, the server may obtain the weather data in a plurality of ways. For example, the server may obtain the weather data through, e.g., a weather forecast. As another example, the server may obtain the weather data through sensing devices such as temperature sensors, humidity sensors, and rain gauges deployed in the environment where the cleaning device is located.

Descriptions regarding the cleaning time may be found in FIG. 1 and its related description.

The obstacle feature refers to data related to obstacles in the monitoring task region. Obstacles may include walls, pillars, furniture, or the like. In some embodiments, the obstacle feature may include at least one of a location, a size, and a shape of the obstacle.

In some embodiments, the server may obtain the obstacle feature in a plurality of ways. For example, the server may obtain the obstacle feature by marking obstacles when generating the work region map. The server may also collect image data within the monitoring task region via the monitoring device, identify obstacles using an object detection algorithm, or the like, and obtain the obstacle feature. The object detection algorithm may include You Only Look Once (YOLO), Single Shot MultiBox Detector (SSD), Faster R-CNN, or the like.

The range determination model refers to a model for determining the operating range, and in some embodiments, the range determination model may be a machine learning model. For example, the range determination model may include any one or a combination of a Recurrent Neural Network (RNN) model, a Neural Network (NN) model, or other customized model structure.

In some embodiments, the server may input the device parameters of each of the plurality of working trajectory points and the cleaning device corresponding to the working trajectory points into the range determination model to determine the operating range of each working trajectory point.

In some embodiments, the server may be trained to obtain the range determination model based on a plurality of training samples with labels, by a gradient descent algorithm, etc.

In some embodiments, the server may train an acquisition range determination model based on a training sample set.

In some embodiments, the training sample set may include a plurality of sets of training samples and labels corresponding to each set of training samples in the plurality of training sample set. Each set of training samples may include sample working trajectory points, sample regional features, sample device parameters, sample pedestrian flow data, sample weather data, and sample historical cleaning data, and the labels corresponding to each set of training samples include an actual operating range corresponding to each set of training samples.

In some embodiments, the training samples may be obtained based on historical data, and the labels may be the actual operating ranges of the sample working trajectory points in the historical data.

In some embodiments, the training samples may also be manually collected by a technician and the actual operating range of the sample working trajectory points in the training samples are measured as labels.

In some embodiments, the plurality of training samples in the training sample set may include a plurality of training samples collected under different work scenarios for different lengths of time. The count of training samples collected under each of the different work scenarios and the count of training samples for each of the different time lengths satisfy the training condition. The work scenario may include at least one of a variety of scenarios such as a shopping mall, an office building, a home, or the like.

In some embodiments, the training condition may be pre-set based on historical experience. For example, the training condition may be that the count of training samples collected under each of the different work scenarios is not less than a first threshold in the total count of training samples and that the count of training samples collected under each of the different lengths of time is not less than a second threshold.

In some embodiments, the first threshold and the second threshold may be pre-set based on historical experience.

In some embodiments, the first threshold may include a plurality of first sub-thresholds, a count of sub-thresholds being consistent with a count of different work scenarios. For example, if the training sample set includes training samples collected in 4 work scenarios, the count of training samples collected in each work scenario may account for no less than 20% of the total count of training samples.

In some embodiments, the second threshold may include a plurality of second sub-thresholds, the count of sub-thresholds being consistent with a count of different lengths of time. For example, if the training sample set includes training samples with a time length of 10 minutes and training samples with a time length of 20 minutes, the count of training samples with a time length of 10 minutes in the total count of training samples is less than a percentage of the count of training samples with a time length of 20 minutes in the total count of training samples.

Understandably, training samples with long time lengths contain more data, and at the same time may contain more noise or disturbances, and increasing the percentage of training samples with long time lengths improves the ability of the range determination model to handle complex data.

In some embodiments, the range determination model may be trained by inputting a plurality of sets of training samples into an initial range determination model, constructing a loss function using the labels and prediction results of the initial range determination model, iteratively updating the initial range determination model based on the loss function, and when the loss function of the initial range determination model meets the preset condition, training the range determination model. The preset condition may be that the loss function converges, the count of iterations reaches a set value, or the like.

According to some embodiments of the present disclosure, a plurality of sets of training samples of different lengths of time collected in different work scenarios are used in training the range determination model, and the model may learn more varied patterns and regularities, and may handle different lengths of data, thereby better adapting to different stages of the actual cleaning task. This enables the model to run stably even when it encounters unexpected sequence lengths and does not produce incorrect predictions due to sudden changes in data length. The diversity of inputs improves the robustness and generalizability of the model.

According to some embodiments of the present disclosure, determining the operating range by the range determination model may utilize the self-learning capability of the machine learning model to find patterns from a plurality of pieces of data, and improve the accuracy and efficiency of determining the operating range.

In some embodiments, the server may obtain the pedestrian flow data via the monitoring device; determine an estimated pedestrian flow based on the pedestrian flow data; adjust the display update instruction based on the estimated pedestrian flow.

Descriptions regarding the monitoring device may be found in FIG. 1 and its related description.

The pedestrian flow data refers to the statistics of the count of people passing through or staying at the monitoring task region in a unit time. The unit time may be pre-set. For example, the unit time is 1 minute, half an hour, an hour, or the like.

In some embodiments, the server may obtain image data of the monitoring task region through the monitoring device. The server may determine, based on the monitoring image data, the count of people passing through or staying in the monitoring task region per unit time through an object detection algorithm, or the like, and determine the obtained count of people as the pedestrian flow data. Descriptions regarding the object detection algorithm may be found above and its related description above.

The estimated pedestrian flow refers to a predicted pedestrian flow in the monitoring task region over a plurality of future time periods. The duration of a future time period and the count of time periods in the plurality of future time periods may be pre-set based on historical experience. For example, the duration of one future time period may be 10 minutes and the count of time periods may be 12.

In some embodiments, the server may determine, based on the pedestrian flow data, a reference pedestrian flow corresponding to reference flow data as the estimated pedestrian flow by querying the reference flow data corresponding to the pedestrian flow data in a preset flow table.

In some embodiments, the preset flow table may be pre-set based on historical experience. The preset flow table may include a plurality of pieces of reference flow data and a reference pedestrian flow corresponding to each reference flow data. The reference flow data refers to the pedestrian flow data in historical data. The reference pedestrian flow refers to the pedestrian flow in the monitoring task region in the historical data for the plurality of future time periods after the reference flow data is determined.

In some embodiments, the server may determine the estimated pedestrian flow based on the pedestrian flow data, historical pedestrian flow data, the regional feature, the work scenarios, the weather data, and a temporal feature through a pedestrian flow prediction model. The server may obtain the historical pedestrian flow data through the memory. Descriptions regarding the regional feature, the work scenarios, and the weather data may be found in related descriptions hereinabove.

In some embodiments, the temporal feature may include a time period corresponding to the pedestrian flow data and whether or not the day is a weekday. It will be appreciated that there is a difference in the pedestrian flow at different times of the day, as well as a difference in the pedestrian flow on weekdays and days off.

In some embodiments, the server may determine, via a timer deployed within the server, the time period corresponding to the pedestrian flow data and determine whether the day is a workday based on calendar information stored in the memory.

The pedestrian flow prediction model refers to a model for estimating the pedestrian flow, and in some embodiments, the pedestrian flow prediction model may be a machine learning model. For example, the pedestrian flow prediction model may include any one or a combination of a Recurrent Neural Network (RNN) model, a Neural Networks (NN) model, or other customized model structure.

In some embodiments, the server may train the pedestrian flow prediction model based on a plurality of prediction training samples with labels by a gradient descent algorithm, or the like. The prediction training samples may include sample pedestrian flow data, historical pedestrian flow data, a sample reginal feature, sample work scenarios, sample weather data, and a sample temporal feature, and the labels of the prediction training samples may be actual prediction flow in a plurality of future time periods corresponding to the prediction training samples.

In some embodiments, the prediction training samples may be obtained based on historical data, and the labels of the prediction training samples may be the actual pedestrian flow in the plurality of future time periods after the sample pedestrian flow data is determined in the historical data.

In some embodiments, the prediction training samples may be manually collected by a technician, and actual pedestrian flow in the plurality of future time periods after the collection of the prediction training samples is counted as labels for the prediction training samples.

In some embodiments, the training process of the pedestrian flow prediction model is similar to the training process of the range determination model, the implementation of which may be seen in the training process of the range determination model.

In some embodiments, the server may adjust the display update instruction in a variety of ways based on the estimated pedestrian flow. For example, the server may, based on the estimated pedestrian flow, select a future time period that has the highest pedestrian flow in the estimated pedestrian flow, adjust the display update instruction at the future time period and send it to the monitoring terminal, so as to change, in the monitoring interface, the task completion status of the monitoring task region corresponding to the estimated pedestrian flow to a status of pending completion.

In some embodiments, the server may determine a pedestrian flow index based on the estimated pedestrian flow, and in response to the pedestrian flow index satisfying an adjustment condition, adjust the display update instruction and send it to the monitoring terminal, so as to change, in the monitoring interface, the task completion status of the monitoring task region corresponding to the estimated pedestrian flow in the monitoring interface to a status of pending completion. The adjustment condition may include being greater than an adjustment threshold.

In some embodiments, the server may determine, based on the weather data, a reference threshold corresponding to a reference value range as the adjustment threshold by querying the reference value range in a preset threshold table containing the weather data.

In some embodiments, the preset threshold table may include a plurality of reference value ranges and a reference threshold corresponding to each of the plurality of reference value range. The reference value range refers to a value range of a segment of a plurality of pieces of data in the weather data. The reference threshold may be determined by manual labeling.

It can be understood that the pedestrian flow index may indicate the total pedestrian flow at a future time. When the total pedestrian flow at the future time is greater than the adjustment threshold, the pedestrian flow in the monitoring task region where the cleaning has been completed is higher, and it is likely to be contaminated again. At this time, changing the task completion status to the status of pending completion and cleaning the monitoring task region again may ensure the durability of the cleaning work.

In some embodiments, the pedestrian flow index is positively correlated to the pedestrian flow in each future time period in the estimated pedestrian flow, and the higher the pedestrian flow, the higher the pedestrian flow index. Exemplarily, if there are three future time periods, the server may multiply the pedestrian flow for each of the three future time periods by three preset coefficients and determine the sum of the products as the pedestrian flow index. The preset coefficients may be set in advance based on historical experience, and the closer the future time period to the current time, the larger the corresponding preset coefficient.

It is understandable that the closer the data is to the current time, the more accurate it is likely to be. Therefore, the closer the future time period to the current time, the larger the corresponding preset coefficient, which may lead to a more accurate pedestrian flow index obtained.

According to some embodiments of the present disclosure, by predicting the pedestrian flow in the monitoring task region in a future time period, and then adjusting the display update instruction, the monitoring task region may be continuously kept in a state of a higher cleanliness degree, improving the quality of the cleaning work.

In some embodiments, the server may determine the pedestrian flow index based on the estimated pedestrian flow, and in response to the pedestrian flow index satisfying the adjustment condition, determine the cleaning time point based on the estimated pedestrian flow. The server may generate a cleaning instruction based on the cleaning time point and send the cleaning instruction to the cleaning device to control the cleaning device to perform the cleaning work. Descriptions regarding determining the pedestrian flow index and the adjustment condition may be found in related descriptions hereinabove.

The cleaning time point refers to a time point when the monitoring task region is cleaned again. In some embodiments, the server may select, within a preset count of future time periods after the time point at which the pedestrian traffic index satisfies the adjustment condition, a future time period with the least estimated pedestrian flow and set the start time of that future time period as the cleaning time point.

In some embodiments, the server may select, within the preset count of future time periods after the time point at which the pedestrian traffic index satisfies the adjustment condition, a future time period with the highest estimated pedestrian flow and set the start time of a first future time period after that future time period as the cleaning time point.

In some embodiments, the server may determine, based on the weather data, a reference count corresponding to the reference value range as a preset count by querying the reference value range in a preset threshold table containing the weather data.

In some embodiments, the preset threshold table may include a plurality of reference value ranges and a reference count corresponding to each of the plurality of reference value ranges. The reference count may be determined by manual labeling.

Understandably, determining the cleaning time points within the preset count of future time periods ensures that the monitoring task region may be cleaned on time.

In some embodiments, the cleaning instruction may include the cleaning time point and an identifier of the cleaning device to perform the cleaning work.

According to some embodiments of the present disclosure, by determining the cleaning time point, the monitoring task region that may become dirty may be cleaned again on time to ensure its cleanliness.

According to some embodiments of the present disclosure, a non-transitory computer-readable storage medium is provided, and a storage medium stores computer instructions. When the computer reads the computer instructions in the storage medium, the computer executes the method for indoor operation monitoring of the cleaning device as described in any one of the above embodiments.

In another embodiment, the method for indoor operation monitoring of the cleaning device may include the following operations.

In S1, a work region map is generated and monitoring map is formed based on location fingerprints taken from a work region. The work region includes a plurality of monitoring task regions, the location fingerprints include but are not limited to, a WiFi signaling feature, a Bluetooth signaling feature, and/or a geomagnetic signaling feature. The monitoring map may also be referred to as monitoring map data.

This embodiment may locate a traditional cleaning device in real time indoors via Bluetooth, WiFi, or geomagnetic positioning technology, automatically collect the movement location data of the cleaning device and upload the data to a cloud server via the MQTT (message queuing telemetry transport) transmission protocol for categorization and calculation, realizing the systematic display of the cleaning work of the device and the clear management of the cleaning task. Compared to the traditional GPS positioning technology, the positioning modules that integrates the Bluetooth, WiFi, and geomagnetic positioning technology have a lower cost, solve the problem that GPS cannot be applied indoors, which effectively improves the positioning of the minimum accuracy, ensuring the accuracy of the obtained positioning of the cleaning device Specifically, before operating the monitoring device, it is necessary to pre-produce an region map and collect location fingerprints of the corresponding the work region. In this embodiment, the corresponding work region map may be drawn by using an image of an indoor computer aided design (CAD) map of an imported work region as a base image through the drawing software, which specifically includes obtaining the map of the corresponding work region according to task information, and then collecting the corresponding covered fingerprint lines using a smartphone when the indoor map is obtained. For example, a line may be drawn in the work region map, and then by clicking start, holding the phone flat and maintaining an even speed to walk to the terminal from the starting point of the line. All Bluetooth information, WiFi signals, and geomagnetic signals are collected in the process and saved as fingerprint features for location matching.

In another embodiment, an intelligent robot having a laser radar with a positioning calculation module, or the like, may also be utilized first to complete the drawing of the work region map and the collection of location fingerprint information. The collection of the fingerprint information further includes the following operations. The intelligent robot having the laser radar is used to draw the work region map through the laser radar at the first time when the intelligent robot is operated in the work region. Running again after confirming the work region map and collecting fingerprints of each location within the work region map. The location fingerprints include but are not limited to, the WiFi signaling feature, the Bluetooth signaling feature, and/or the geomagnetic signaling feature. Specifically, for a nontraditional automatic cleaning device including a laser radar sensor, fingerprint acquisition and real-time positional matching of the corresponding position of the device may be carried out directly through the autonomous acquisition of the device using the laser radar. It avoids the data errors caused by the different properties of the device or the inability to move forward at a uniform speed through the fingerprint acquisition by cell phone in the traditional mode and improves the flexibility and adaptability of this manner.

In S2, a set of positioning data sent by a cleaning device performing a task is parsed. The set of positioning data includes a plurality of location data, the location data includes location information of the cleaning device and corresponding time information. The working trajectory points of the cleaning device are obtained based on the location data by calculation.

Specifically, the cleaning device uploads real-time data to the cloud server through the MQTT data protocol after obtaining the corresponding WiFi, Bluetooth, and geomagnetic data of the set of positioning data. At the same time, the real-time data is recorded in the form of files and uploaded to the cloud server in phases via HTTPS (hypertext transfer protocol secure), which ensures the integrity of the uploaded data in the case of device disconnection or weak network. On the other hand, the cloud server, after receiving the data, may obtain plural piece of data after performing article-by-article localization computation and task slicing computation on the plural piece of data, which includes, but is not limited to, the time information, the location information, and the device operating status. If the cleaning device are cleaning devices of various types, the device operating status of the cleaning device may include, but is not limited to, information such as a blower status, a water status, a disk brush status, and odometer status, etc. The location information includes, but is not limited to, a building identifier, a floor identifier, and coordinate data. In the subsequent embodiments, the cleaning device is mainly taken as an example to carry out a specific description. Certainly, the manner is also applicable to other cleaning devices.

In S3, a monitoring task region in a current monitoring interface is obtained, monitoring task region map data in the monitoring map data is obtained based on the monitoring task region, each collected working trajectory point is matched with the corresponding monitoring task region map data, and a cumulative trajectory point in each monitoring task region is obtained. The cumulative trajectory points may also be referred to as cumulative working trajectory points. The monitoring region map may also be referred to as monitoring task region map data.

Further, monitoring task region identification information selected by the current monitoring interface is obtained. The monitoring task region identification information include, but is not limited to, a building identification, a floor identification, and a region identification, and the corresponding monitoring task region map data in the monitoring map data is obtained based on the monitoring task region identification. The identification information may also be referred to as monitoring task region identification.

In specific embodiments, in order to better monitor the device operating status and manage the working task of the device, the work region of each device on the same floor is often divided and split into a plurality of sub-monitoring task regions, so as to separately carry out task monitoring on each monitoring task region and carry out an overall assessment of the task completion status of each device by region, to achieve a clear task report display under the positioning accuracy within a range of 3 meters-20 meters to enhance the efficiency of task management. For example, the manager may pre-set floor settings for n buildings such as B1, B2 . . . . Bn, as well as region settings for each floor. For example, the B1 building is divided into B1-f1 floor, B1-B1-f2 floor . . . B1-fm floor, and then for the B1-fm floor, a plurality of regions Z1, Z2 . . . . Zo, etc., are set up. The cleaning task and completion requirements are set up according to the various regions, for example, for a certain region Zo, the cleaning task is set to clean at a certain time, such as 3 hours from 8:00 A.M. to 5:00 P.M. The cloud server determines the cleaning status of each region based on the trajectory points received from the cleaning device that performs the task in the corresponding work region, in order to estimate the task completion status.

In S4, a display feature update instruction of a corresponding monitoring task region is sent to the monitoring interface based on whether a count of the working trajectory points and distribution status meets a preset coverage requirement of the monitoring task region.

Specifically, the manager sets up three regions to be cleaned within the first floor of the B1 building, and the cloud performs the estimation of the cleaning time and the cleaning region of each device based on the count and distribution status of the working trajectory points of the device in each received region. When both the cleaning time and the cleaning region have reached a preset requirement, it indicates that the cleaning of the region is complete, thus updating a graphical representation and the completion status of the region within the monitoring interface.

In some embodiments of the present disclosure, S4 may include the following operations.

In S101, a circular region of a set radius centered on the working trajectory points is taken as the operating range of the working trajectory points, a cumulative coverage region of the operating range of each working trajectory point in the monitoring task region is calculated, and a current work coverage rate of the monitoring task region is obtained. The work coverage rate refers to a ratio of the cumulative coverage region in the corresponding monitoring task region.

In S102, a count of cumulative working trajectory points from a task start time to a current time in the monitoring task region is calculated.

In S103, in response to the count of cumulative working trajectory points being greater than a minimum count of trajectory points and the work coverage rate being greater than a set value, an update instruction of switching the display feature of the corresponding monitoring task region to a first display feature is sent to the monitoring interface.

For example, for the Zo region on the 1st floor of the B1 building, an interval of the collected working trajectory points is set to 10 seconds, and the work requirement is to be clean for 3 hours from 8:00 A.M. to 5:00 P.M. If the positioning data collection period of the device is 10 s, the count of trajectory points that need to be collected within the 3-hour task duration is 3 h×60 min/h×60 s/min÷10 s/time=1080 points. When the count of trajectory points collected from 8:00 A.M. to 5:00 P.M is greater than 1080, it means that the count of cumulative working trajectory points of this cleaning device satisfies the requirement.

At the same time, the current work coverage rate of the monitoring task region is obtained. Specifically, the work area is estimated by the coordinates of the working trajectory points, and the current work coverage is calculated by point-to-surface extrapolation, the work region calculation process is simplified. For example, it is set that when a working trajectory point is detected, by default, the region within its radius of 20 meters is swept. An area of a cumulative coverage region of each trajectory point is calculated. When the coverage region is greater than 80%, it means that the work coverage rate of the cleaning task meets the requirement. When the count of cumulative work track points of the current cleaning device is greater than a preset count and the work coverage rate is greater than a set value, it indicates that the cleaning device has completed the cleaning task in the current region, and then the current monitoring task region corresponding to the monitoring interface is marked with a task completion identification. To show the cleaning task effect that the manager needs to view through the visualization way, the manager may intuitively and clearly understand the current task completion progress and completion information, and effectively enhance the management efficiency of the manager of the cleaning personnel and cleaning work.

In another embodiment, it is also possible to monitor the completion of a plurality of repetitions of a cleaning task by the cleaning device in the monitoring task region as follows.

S4 also includes the following operations.

In S201, a task duration and a cleaning frequency to be achieved by a cleaning device assigned to the monitoring task region is obtained, the cleaning frequency and the positioning data collection period of the device is calculated based on the task duration to obtain the minimum count of corresponding trajectory points in the monitoring task region. The number threshold may also be referred to as the minimum count of the trajectory points.

In S202, the count of cumulative working trajectory points of the cleaning device located in the monitoring task region from the task start time to the current time is calculated, and the cumulative coverage region of the operating range of each working trajectory point is calculated to obtain the current work coverage rate of the monitoring task region.

In S203, if the count of cumulative working trajectory points is greater than the minimum count of trajectory points and the work coverage rate is greater than the set value, the update instruction of switching the display feature of the corresponding monitoring task region to the first display feature is sent to the monitoring interface.

By judging the completion situation of the cleaning device in two aspects, the overall cleaning effect and statistical accuracy of the cleaning device are guaranteed, avoiding the occurrence of problems such as cleaning the same location for a long time or incomplete cleaning.

In another embodiment, a plurality of cleaning devices performing the same cleaning task in concert may exist in the same monitoring task region, at which time the completion situation of the cleaning task in the monitoring task region requires an assessment of the common progress of the plurality of cleaning devices, which may specifically include the following operations.

In S301, a selected monitoring task attribute and the monitoring task region in the current monitoring interface are obtained, the cleaning devices whose location information indicates working trajectory points localized within the monitoring task region are screened according to the monitoring task attribute, and working trajectory points of a plurality of cleaning devices corresponding to the monitoring task attribute are selected.

Some of these cleaning devices have a plurality of cleaning functions and may be involved in a plurality of cleaning tasks. For these devices, it is necessary to determine whether the specific cleaning task that is in progress when sending positioning data is the selected monitoring task. For these cleaning devices having a plurality of cleaning functions, task identifiers may be added to the positioning data sent by the device to indicate the function it is currently running, so as to determine whether its working trajectory points are required for this monitoring task screening, making S301 specifically may also include the following operations.

The selected monitoring task attribute and the monitoring task region in the current monitoring interface are obtained, and the working trajectory points whose location information is localized within the monitoring task region are screened according to the monitoring task attribute. Working trajectory points corresponding to the positioning data with the same type of task identifier are added to a first trajectory point set the corresponding.

If the positioning data of some of the trajectory points do not have the task identifiers, device identifiers of the positioning data that do not have the task identifiers are obtained, the task identifiers that may be executed by the device are obtained by querying a device database according to the device identifiers, and whether the task identifiers match the currently selected monitoring task identifiers is determined. If the task identifiers match the currently selected monitoring task identifiers, the corresponding working trajectory points are added to the first trajectory point set, otherwise the corresponding working trajectory points are not added to the first trajectory point set.

In S302, a count of second working trajectory points in the first trajectory point set from the start time of the monitoring task to the current time is calculated and the cumulative coverage region of the operating range of each second working trajectory point is calculated, and the current work coverage rate of the monitoring task region is obtained.

In S303, in response to the count of second working trajectory points being greater than the minimum count of trajectory points and the work coverage rate is greater than the set value, the display feature in the monitoring interface corresponding to that monitoring task region is switched to the first display feature. The minimum count of trajectory points is calculated based on the positioning data collection period of each device and the minimum cleaning time set for the target monitoring task region. For example, for the target monitoring task region, the 1st task device collects the working trajectory points at an interval of a seconds, the 2nd task device collects the working trajectory points at an interval of b seconds, and the target monitoring task region is cleaned with a cleaning requirement to ensure that there is the cleaning device in operation for m hours. Then the minimum count of trajectory points S is S=M*3600/min (a, b). Certainly, other pre-configured minimum trajectory point algorithms may be used to obtain the corresponding minimum count of trajectory points.

By monitoring the cleaning work status of each collaborative cleaning device, the management staff's control and adjustment of each current cleaning task are further improved.

The present disclosure discloses a method for monitoring the indoor operation of the cleaning device. The method includes the following operations. The set of positioning data sent by the cleaning device performing the task is parsed and the monitoring task region in the current monitoring interface is obtained. Corresponding monitoring task region map data is obtained from monitoring map data based on the monitoring task region. Each working trajectory points collected is matched with the corresponding monitoring task region map data. The cumulative working trajectory points in the monitoring task region are obtained, and the display features of the corresponding monitoring task region in the monitoring interface are finally updated according to whether the count of the cumulative working trajectory points and the distribution status meet the preset coverage requirement of the monitoring task region. This enables traditional low-cost cleaning device to effectively monitor the completion of tasks in the target region and accurately obtain the completion status of the task it performs, even in the absence of higher-computing-power computing units and laser radar, which effectively improves the task management efficiency of these traditional devices.

In another embodiment, a system for indoor operation monitoring of the cleaning device is also provided, as shown in FIG. 5. The system includes a plurality of cleaning devices, a server connected to each of the plurality of cleaning devices via a network, and a monitoring terminal for displaying a monitoring interface. Each of the plurality of the cleaning devices is configured to collect the current position and time of the device at a set interval and send the current position and time to the server via the network. The server is configured to form the monitoring map data based on a work region map and location fingerprints taken from the work region, and the work region includes a plurality of monitoring task regions; parse a set of positioning data sent by the cleaning device performing the task, and the set of positioning data includes a plurality of pieces of location data, the location data including location information of the cleaning device and corresponding time information; obtain the working trajectory points of the cleaning device based on the location data by calculation; after receiving a request for displaying the monitoring task region on the monitoring interface sent by a monitoring terminal, obtain the corresponding monitoring task region data in the monitoring map data according to the monitoring task region, and the collected working trajectory points are matched with the corresponding monitoring task region map data to obtain the cumulative working trajectory points in each monitoring task region; and send a display feature update instruction of a corresponding monitoring task region to the monitoring interface based on whether a count of the working trajectory points and distribution status meets a preset coverage requirement of the monitoring task region. The monitoring terminal is configured to update the display feature of the corresponding monitoring task region on the monitoring interface based on the display feature update instruction sent by the serve.

In some embodiments, the location fingerprints may include a WiFi signaling feature, a Bluetooth signaling feature, or a geomagnetic signaling feature. The cleaning device may be a Bluetooth module capable of capturing the Bluetooth signaling feature contacted during movement, a WiFi module capable of capturing the WiFi signaling feature contacted during movement, and a microcontroller connected to the Bluetooth module and WiFi module. The minimal hardware of the cleaning device is only a chip with Bluetooth/WiFi functionality and a microcontroller. If the positioning accuracy needs to be improved, a navigation module such as a 10-axis inertial navigation module may be added. The 10-axis inertial navigation module is composed of a 3-axis accelerometer, a 3-axis gravity, a 3-axis magnetometer, and a barometer, which allows the cloud server to use WiFi data, Bluetooth data, and geomagnetic data collected by the cleaning device for observation, use odometer and inertial guidance for prediction, and then calculate through the Kalman filtering algorithm and particle filtering algorithm to ultimately obtain positioning results of the device.

Specifically, the cleaning device may be Bluetooth-enabled to distribute the network, which may be configured using a smartphone. The cleaning devices may upload real-time data to the server via the MQTT when collecting and uploading the device status and record the real-time data in the form of a file, or the HTTPS may be applied to upload a piece of data at once. When the cleaning device discovers that the network is offline and causes the data to fail to be sent, it may save the real-time data and continue to upload it after the network recovered subsequently. After the server receives the data, the data finally obtained is plural pieces of data, each of which contains, but is not limited to, a timestamp, location information, a device operating status, etc. The location information may include building identification, floor identification, x-axis and y-axis location information, etc., and the device operating status includes but is not limited to a fan status, a water status, a disk brush status, odometer data, etc. After the server performs task calculations and data calculations, the data may be sent to the monitoring terminal and ultimately displayed on the App or the Web terminal of the terminal.

In some embodiments, the system for indoor operation monitoring of the cleaning device may further include an intelligent cleaning device having laser radar. The intelligent cleaning device is configured to draw the work region map by the laser radar and running again and collecting the location fingerprints of each location within the work region map after determining the work region map. The location fingerprints include but are not limited to, a WiFi signaling feature, a Bluetooth signaling feature, or a geomagnetic signaling feature.

Specifically, the intelligent cleaning device may be an automated cleaning robot that may use the laser radar to directly draw the map before the monitoring task begins. After completing the mapping, the intelligent cleaning device may collect the WiFi signaling feature, the Bluetooth signaling feature, and the geomagnetic signaling feature when operating in the region to complete the collection of the location fingerprints within the work region. If the system does not have the intelligent cleaning device, the system may import a plan image of the work region, such as a CAD map and use the image as a base image to create a usable indoor map on a mapping software. Then, with the indoor map already obtained, the smartphone is used to obtain the corresponding covered fingerprint lines. For example, a line may be drawn in the work region map, and then by clicking start, holding the phone flat and maintaining an even speed to walk to the terminal from the starting point of the line. All Bluetooth information, WiFi signals, and geomagnetic signals are collected in the process and saved as fingerprint features for location matching.

In this embodiment, as the location fingerprints decay over time. For example, the replacement of storefronts in the region leads to changes in WiFi and changes in the structure of a part of the walls, making the location fingerprints in the shopping mall-type work region decay more in about 1 year, which leads to the corresponding positioning accuracy decreasing, such as 10 meters accuracy decaying to 15 meters. The longer the time, the worse the accuracy. Therefore, the intelligent cleaning device operating in these work regions may be utilized to collect the latest location fingerprint information each time they operate in the regions to update fingerprint data, maintain the positioning accuracy of the devices, and solve the problem of updating fingerprints for indoor positioning. The operations are as follows.

The automated cleaning robot collects the location fingerprints in real time each time it performs a task in the task region. In this embodiment, the automatic cleaning robot collects positioning data and sends it to the server, the positioning data includes the location information and WiFi fingerprint data. The location information includes x-axis and y-axis coordinates and floor identification. After receiving all the new positioning data of the automatic cleaning robot in the current task region, the server, after comparing the new positioning data with the original positioning data of the current task region in the stored monitoring map data, updates the stored positioning data for the task region.

Specifically, the server queries original monitoring map data to obtain the original location information and the original WiFi fingerprint data of the same location based on the new location information obtained, averages the received new WiFi fingerprint data and the original WiFi fingerprint data and stores them as the updated WiFi fingerprint data corresponding to the location information.

If the same MAC address stored in the WiFi fingerprint of the positioning data of the task region does not appear in the new positioning data received by the server a plurality of times from the automatic cleaning robot in the same task region, the positioning data corresponding to that MAC address is removed from the stored positioning data of the task region.

In this embodiment, the server is specifically configured to take a circular region of a set radius centered on the working trajectory points as the operating range of the working trajectory points, calculate a cumulative coverage region of the operating range of each working trajectory point in the monitoring task region, and obtain a current work coverage rate of the monitoring task region is obtained. The work coverage rate refers to a ratio of the cumulative coverage region in the corresponding monitoring task region. The server is configured to calculate a count of cumulative working trajectory points from a task start time to a current time in the monitoring task region; and in response to the count of cumulative working trajectory points being greater than a preset number and the work coverage rate being greater than a set value, send an update instruction of switching the display feature of the corresponding monitoring task region to a first display feature to the monitoring interface. The first display feature is used to identify that the selected monitoring task has been completed in the monitoring task region.

The specific functions of the above-described system for indoor operation monitoring of the cleaning device correspond one by one with the method for indoor operation monitoring of the cleaning device disclosed in the previous embodiments, and therefore will not be described herein in detail, but may be described in detail with reference to the previously disclosed method for indoor operation monitoring of the cleaning device. It should be noted that each embodiment in the present disclosure is described in a progressive manner, and each embodiment focuses on the differences from other embodiments, with each embodiment referring to the common and similar parts of each other.

In addition, certain features, structures, or characteristics of one or more embodiments of the present disclosure may be suitably combined.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Should there be any inconsistency or conflict between the description, definition, and/or the use of a term associated with any of the incorporated material and that associated with the present document, the description, definition, and/or the use of the term in the present document shall prevail.

What is claimed is:

1. A method for indoor operation monitoring of a cleaning device, wherein the method is performed by a server of a system for indoor operation monitoring of a cleaning device, and the method comprises:

generating a work region map;

forming a monitoring map based on location fingerprints taken from a work region in the work region map;

determining working trajectory points of the cleaning device based on a set of positioning data sent by the cleaning device;

obtaining a monitoring task region through a monitoring terminal;

determining, based on the monitoring map, a monitoring region map corresponding to the monitoring task region, matching the working trajectory points with the monitoring region map, and determining cumulative trajectory points within the monitoring task region; and in response to determining that a count of the cumulative trajectory points and a distribution situation of the cumulative trajectory points satisfy a preset update condition, sending a display update instruction to the monitoring terminal.

2. The method of claim 1, wherein the determining, based on the monitoring map, a monitoring region map corresponding to the monitoring task region includes:

determining the monitoring region map corresponding to the monitoring task region based on the monitoring map and identification information in a monitoring interface.

3. The method of claim 2, wherein the distribution situation includes a work coverage rate, and the in response to determining that the count of the cumulative trajectory points and the distribution situation of the cumulative trajectory points satisfy the preset update condition, sending a display update instruction to the monitoring terminal includes:

determining a cumulative coverage region based on an operating range of the working trajectory points;

determining the work coverage rate based on the cumulative coverage region and the monitoring task region; and in response to determining that the count of the cumulative trajectory points and the work coverage rate satisfy the preset update condition, sending the display update instruction to the monitoring terminal.

4. The method of claim 3, wherein the in response to determining that the count of the cumulative trajectory points and the work coverage rate satisfy the preset update condition, sending the display update instruction to the monitoring terminal includes:

determining a number threshold of the cumulative trajectory points in the monitoring task region based on a task duration, a cleaning frequency, and a data collection period of the cleaning device; and in response to the count of the cumulative trajectory points being greater than the number threshold and the work coverage rate meeting the preset update condition, sending the display update instruction to the monitoring terminal.

5. A system for indoor operation monitoring of a cleaning device, wherein the system includes a cleaning device, a server connected to the cleaning device via a network, and a monitoring terminal for displaying a monitoring interface;

the cleaning device is configured to collect a set of positioning data based on a data collection period and send the set of positioning data to the server via the network;

the server is configured to:

generate a work region map;

form a monitoring map based on location fingerprints taken from a work region in the work region map;

determine working trajectory points of the cleaning device based on the set of positioning data sent by the cleaning device;

obtain a monitoring task region through the monitoring terminal;

determine, based on the monitoring map, a monitoring region map corresponding to the monitoring task region, match the working trajectory points with the monitoring region map, and determine cumulative trajectory points within the monitoring task region; and in response to determining that a count of the cumulative trajectory points and a distribution situation of the cumulative trajectory points satisfy a preset update condition, send a display update instruction to the monitoring terminal; and the monitoring terminal is configured to update a display feature on the monitoring interface based on the display update instruction sent by the server.

6. The system of claim 5, further comprising an intelligent cleaning device, wherein the intelligent cleaning device includes laser radar, and the intelligent cleaning device is configured to generate, through the laser radar, the work region map and collect the location fingerprints.

7. The system of claim 6, wherein the location fingerprints include a WiFi signaling feature and a Bluetooth signaling feature, and the cleaning device includes a Bluetooth module, a WiFi module, and a microcontroller connected to the Bluetooth module and the WiFi module, the Bluetooth module is configured to collect the Bluetooth signaling feature and the WiFi module is configured to collect the WiFi signaling feature.

8. The system of claim 7, wherein the server is further configured to:

determine a cumulative coverage region based on an operating range of the working trajectory points;

determine the work coverage rate based on the cumulative coverage region and the monitoring task region; and in response to determining that the count the cumulative trajectory points and the work coverage rate satisfies the preset update condition, send the display update instruction to the monitoring terminal.

9. The system of claim 8, wherein the server is further configured to:

determine a number threshold of the cumulative trajectory points in the monitoring task region based on a task duration, a cleaning frequency, and a data collection period of the cleaning device; and in response to the count of the cumulative trajectory points being greater than the number threshold and the work coverage rate meeting the preset update condition, send the display update instruction to the monitoring terminal.

10. A server comprising a memory, a processor, and a computer program stored in the memory and runnable on the processor, wherein when executing the computer program, the processor implements the method of claim 1.

* * * * *